US011228630B2

(12) United States Patent
Halepovic et al.

(10) Patent No.: US 11,228,630 B2
(45) Date of Patent: *Jan. 18, 2022

(54) ADAPTIVE BIT RATE MEDIA STREAMING BASED ON NETWORK CONDITIONS RECEIVED VIA A NETWORK MONITOR

(71) Applicant: AT&T Intellectual Property I, L.P., Atlanta, GA (US)

(72) Inventors: Emir Halepovic, Somerset, NJ (US); Jeffrey Erman, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,637

(22) Filed: Jan. 2, 2020

(65) Prior Publication Data

US 2020/0137133 A1 Apr. 30, 2020

Related U.S. Application Data

(63) Continuation of application No. 15/629,449, filed on Jun. 21, 2017, now Pat. No. 10,536,500, which is a
(Continued)

(51) Int. Cl.
*G06F 15/16* (2006.01)
*H04L 29/06* (2006.01)
(Continued)

(52) U.S. Cl.
CPC ............ *H04L 65/601* (2013.01); *G06F 16/43* (2019.01); *G06F 16/903* (2019.01);
(Continued)

(58) Field of Classification Search
None
See application file for complete search history.

(56) References Cited

U.S. PATENT DOCUMENTS 7,027,982 B2  4/2006  Chen et al.
7,925,774 B2  4/2011  Zhang et al.
(Continued)

FOREIGN PATENT DOCUMENTS

WO  2012028856 A1  3/2012
WO  2011119132 A3  4/2012
(Continued)

OTHER PUBLICATIONS

Akhshabi, S. et al., "An Experimental Evaluation of Rate-Adaptation Algorithms in Adaptive Streaming over HTTP", Proceedings of the Second Annual ACM Conference on Multimedia Systems, MMSys'11, San Jose, California, Feb. 2011, 12 pages.
(Continued)

*Primary Examiner* — Phuoc H Nguyen
(74) *Attorney, Agent, or Firm* — Guntin & Gust, PLC; Douglas Schnabel

(57) ABSTRACT

A method includes receiving, at a device from a content source, a portion of a particular chunk of media content a particular quality level during adaptive bit rate media streaming of the media content. The method includes receiving, at the device, network data related to network conditions associated with the device in response to receipt of the portion. The method also includes, in response to a determination to download the particular chunk at a first quality level different than the particular quality level, the determination based on the particular quality level and the network data: sending a request from the device for the particular chunk at the first quality level to the content source, and replacing the portion with the particular chunk at the first quality level.

20 Claims, 5 Drawing Sheets

Related U.S. Application Data continuation of application No. 14/484,036, filed on Sep. 11, 2014, now Pat. No. 9,722,903.

(51) Int. Cl.
*H04L 12/26* (2006.01)
*G06F 16/43* (2019.01)
*G06F 16/903* (2019.01)
*H04L 12/825* (2013.01)
*H04L 12/811* (2013.01)
*H04L 12/24* (2006.01)

(52) U.S. Cl.
CPC ...... *H04L 43/0876* (2013.01); *H04L 43/0894* (2013.01); *H04L 47/25* (2013.01); *H04L 65/105* (2013.01); *H04L 65/4084* (2013.01); *H04L 65/604* (2013.01); *H04L 65/80* (2013.01); *H04L 41/147* (2013.01); *H04L 43/0888* (2013.01); *H04L 47/38* (2013.01)

(56) References Cited

U.S. PATENT DOCUMENTS

| | | |
|---|---|---|
| 7,949,775 B2 | 5/2011 | Virdi et al. |
| 8,265,140 B2 | 9/2012 | Mehrotra |
| 8,396,114 B2 | 3/2013 | Gu et al. |
| 8,396,983 B1 | 3/2013 | Inskip et al. |
| 8,621,044 B2 | 12/2013 | Sood et al. |
| 8,706,907 B2* | 4/2014 | Katis .......... H04L 51/04 709/240 |
| 2008/0181298 A1 | 7/2008 | Shi et al. |
| 2011/0055328 A1* | 3/2011 | Lahr .......... H04L 67/1002 709/204 |
| 2011/0082914 A1 | 4/2011 | Robert et al. |
| 2011/0122939 A1* | 5/2011 | Ganesan .......... H04N 19/194 375/240.01 |
| 2012/0005361 A1 | 1/2012 | Knittle |
| 2012/0005368 A1 | 1/2012 | Knittle |
| 2012/0179834 A1 | 7/2012 | Van et al. |
| 2012/0203868 A1 | 8/2012 | Myers et al. |
| 2012/0203886 A1 | 8/2012 | Mavromatis |
| 2012/0265853 A1 | 10/2012 | Knox et al. |
| 2012/0311174 A1 | 12/2012 | Bichot et al. |
| 2012/0314718 A1 | 12/2012 | Strasman et al. |
| 2012/0314761 A1 | 12/2012 | Melnyk et al. |
| 2013/0013803 A1 | 1/2013 | Bichot et al. |
| 2013/0042015 A1 | 2/2013 | Begen et al. |
| 2013/0067109 A1 | 3/2013 | Dong et al. |
| 2013/0097309 A1* | 4/2013 | Ma .......... H04L 67/2847 709/224 |
| 2014/0019633 A1 | 1/2014 | Zhang et al. |
| 2014/0019635 A1* | 1/2014 | Reznik .......... H04N 21/6332 709/231 |
| 2014/0025830 A1* | 1/2014 | Grinshpun .......... H04N 21/6131 709/227 |
| 2014/0052846 A1 | 2/2014 | Scherkus et al. |
| 2014/0108495 A1 | 4/2014 | Benno |
| 2014/0189064 A1 | 7/2014 | Cilli et al. |
| 2014/0201324 A1* | 7/2014 | Zhang .......... H04L 67/42 709/217 |
| 2014/0304377 A1 | 10/2014 | Andersson et al. |
| 2014/0310424 A1 | 10/2014 | Andersson et al. |
| 2016/0028595 A1 | 1/2016 | Ramakrishnan et al. |
| 2016/0044125 A1 | 2/2016 | Hardin et al. |
| 2016/0182941 A1 | 6/2016 | Crabtree et al. |

FOREIGN PATENT DOCUMENTS

| | | |
|---|---|---|
| WO | 2013039927 A1 | 3/2013 |
| WO | 2014022017 A1 | 2/2014 |

OTHER PUBLICATIONS

Hong, D. et al., "A chunk-based caching algorithm for streaming video", In NET-COOP 2010—4th Workshop on Network Control and Optimization, Nov. 2010, 8 pages.

Krasic, C. et al., "Quality Adaptive Media Streaming by Priority Drop", NOSSDAV '03, Proceedings of the 13th International Workshop on Network and Operating Systems Support for Digital Audio and Video, 2003, 10 pages.

Liu, C. et al., "Parallel Adaptive HTTP Media Streaming", 2011 Proceedings of 20th International Conference on Computer Communications and Networks (ICCCN), Jul. 2011, 6 pages.

Sanchez, Y. et al., "iDASH: Improved Dynamic Adaptive Streaming over HTTP using Scalable Video Coding", MMSys'11, Proceedings of the Second Annual ACM Conference on Multimedia Systems, San Jose, California, Feb. 2011, 8 pages.

Zambelli, A., "IIS Smooth Streaming Technical Overview", Microsoft Corporation, Mar. 2009, 17 pages.

\* cited by examiner

ADAPTIVE BIT RATE MEDIA STREAMING BASED ON NETWORK CONDITIONS RECEIVED VIA A NETWORK MONITOR

PRIORITY CLAIM

This application is a continuation of U.S. patent application Ser. No. 15/629,449, filed Jun. 21, 2017, which is a continuation of U.S. patent application Ser. No. 14/484,036 (now U.S. Pat. No. 9,722,903) filed on Sep. 11, 2014. The contents of each of the foregoing are hereby incorporation by reference into this application as if set forth herein in full.

FIELD OF THE DISCLOSURE

The present disclosure is generally related to adaptive bit rate media streaming based on network conditions received from a network monitor.

BACKGROUND

Adaptive bit rate media streaming may be used to deliver media content to a device. Adaptive bit rate media streaming may rely on content encoded at multiple encoding bit rates (quality levels), each content item stored in a separate file and segmented into fixed-duration chunks. Streaming services may utilize chunks that are about 2 seconds in duration for streaming via the internet and may utilize chunks that are about 10 seconds in duration for streaming via mobile communications networks. The device that is to receive streaming media content decides which chunk to request and requests the chunk at a particular quality level based on an estimate of network condition. The estimate of network conditions may be based on historical information for the device (e.g., download rate for the device, download rate for packets of a prior set of packets for a chunk, number of requests for replacement packets to replace corrupt packets in received chunks, etc.). Once the device requests a particular chunk, the device will download the particular chunk, process the particular chunk, and send output to an output device (e.g., a display device, an audio system, or both).

DETAILED DESCRIPTION

Figure 1:
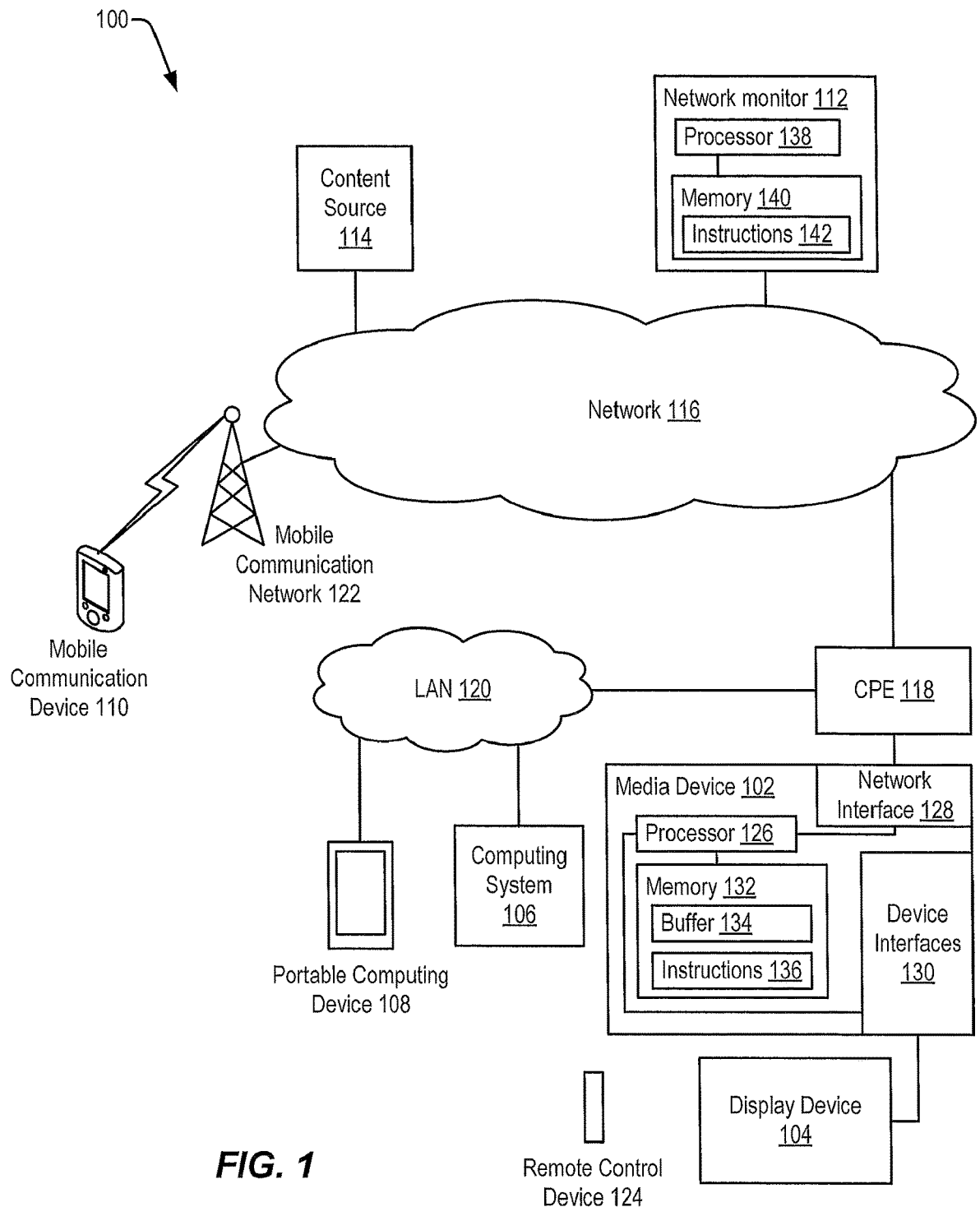
FIG. 1 is a block diagram of a first embodiment of a system for adaptive bit rate media streaming based on network conditions received by a device via a network monitor.

Adaptive bit rate media streaming may be used to send media content from a content source to a user device that plays the media content. The content source may store or produce chunks of the media content at multiple encoding bit-rates (quality levels). The chunks may be of fixed durations (e.g. 10 seconds for chunks transmitted via a mobile communications network and 2 seconds for chunks transmitted via a network associated with an internet service provider). For example, the content source may store a first chunk of particular media content at a first quality level corresponding to a first encoding bit rate at a 1080 progressive (p) spatial resolution and a 30 frames per second (fps) temporal resolution. The content source may also store the first chunk of particular media content at a second quality level corresponding to a second encoding rate at a 720 p spatial resolution and a 30 fps temporal resolution. The content source may also store other versions of the first chunk at other quality levels corresponding to other encoding bit rates. The user device may request a particular chunk at a first quality level and a subsequent chunk at the same quality level or at a different quality level. A quality level selected for a given chunk may be based on network conditions determined by a network monitor.

In an embodiment, the user device determines particular chunks of media content at particular quality levels to request based on data indicative of network conditions provided by the network monitor. In another embodiment, a proxy server determines whether to change the quality level of a particular chunk requested by the user device. The proxy server determines whether to change the quality level based on data indicative of network conditions provided to the proxy server by the network monitor. Using the proxy server to determine whether to modify a request for a chunk to change a quality level associated with the chunk may be implemented in a network and may have the benefit of being transparent to users of user devices. In addition to providing data indicative of network conditions, the network monitor may include a controller that is able to adjust a priority associated with the user device by one or more network devices to increase a likelihood of the user device receiving a requested chunk in a time that will inhibit disruption of playback of the media content by the user device.

Determining the quality level based on network conditions may increase responsiveness to changes in network conditions. The increased responsiveness may enable delivery of the media content at an overall higher quality level than can be delivered based only on determining the quality level of a requested chunk based on historical throughput information. The increased responsiveness may also inhibit disruption of media content playback by reducing a likelihood of buffer underflow. Increasing the overall quality of media content and inhibiting disruption of media content playback may promote customer satisfaction with a service provider and customer retention by the server provider.

In a particular embodiment, a method includes receiving, at a device from a content source, a portion of a particular chunk of media content at a particular quality level. The method includes receiving, at the device, data about network conditions associated with the device in response to receipt of the portion. The method includes making, via the device, a determination based on the data whether to download the particular chunk at a first quality level that is higher than the particular quality level based on the particular quality level and the data. The method includes, in response to the determination indicating to download the particular chunk at the first quality level, sending, to the content source from the device, a request for the particular chunk at the first quality level and replacing the portion with the particular chunk at the first quality level.

In a particular embodiment, a computer-readable storage device include instructions executable by a processor of a device to perform operations. The operations include receiving a portion of a particular chunk of media content at a particular quality level from a content source. The operations include receiving data about network conditions associated with the device. The operations include making a determination whether to download the particular chunk at a first quality level that is higher than the particular quality level based on the particular quality level and the network data. The operations also include, in response to the determination indicating to download the particular chunk at the first quality level, sending a request for the particular chunk at the first quality level to the content source and replacing the portion with the particular chmlk at the first quality level.

In an embodiment, a system includes a processor and a memory in communication with the processor. The memory is executable by the processor to perform operations. The operations include receiving a request for a particular chunk of media content at a first quality level from a device. The operations include sending a query to determine network conditions associated with the device to a network monitor in response to the request. The operations include receiving network data from the network monitor corresponding to network conditions associated with the device. The operations include making a determination whether to adjust the request based on the network data. When the determination is to adjust the request, a modified request is sent to a content source, where the modified request requests the particular chunk at a second quality level. The operations also include receiving the particular chunk via the content source and sending the particular chunk to the device.

FIG. 1 is a block diagram of a particular embodiment of a system 100 for adaptive bit rate media streaming of media content to a particular device of user devices 102-110 associated with a user based on network conditions received by the particular device via a network monitor 112. The media content may be streamed by adaptive bit rate streaming to the particular device from a content source 114. The media content may include, but is not limited to, video content from a video service or service provider, television programming, media on-demand, pay per view programming, audio programming, other content, or combinations thereof.

The user devices 102-110 may include, but are not limited to, one or more media devices 102 and one or more coupled output devices (e.g., one or more sound systems, one or more display devices 104, and combinations thereof), one or more computing systems 106, one or more portable computing devices 108 (e.g. laptop computers, tablet computers, computerized glasses, personal digital assistants, etc.), one or more mobile communication devices 110 (e.g., a mobile phone), other devices, or combinations thereof. The number and type of user devices associated with a particular user may vary. A media device 102 may be a set-top box device, game system, or another device able to send media content to output devices coupled to the media device 102 and able to communicate via a network 116 (e.g., the internet, a private network, or both). The media device 102 may be an integral component of a display device 104 or a separate component.

One or more of the user devices 102-110 may receive streaming media content from the network 116 via customer premises equipment (CPE) 118. The CPE 118 may facilitate communications between the network 116 and each media device 102 coupled to the CPE 118. The CPE 118 may also facilitate communications to and from the network 116 and one or more user devices (e.g., user devices 106-110) coupled by a wireless connection or a wired c01mection to a local area network (LAN) 120 established by, or accessible to, the CPE 118. The CPE 118 may be an access point to the network 116. The CPE 118 may include a router, a wireless router, a local area network device, a modem (e.g., a digital subscriber line modem or a cable modem), a residential gateway, another communication device, or combinations thereof.

A device of the user devices 102-110 (e.g., the portable computing device 108 or the mobile communication device 110) may be able to receive the streaming media content via a mobile communication network 122 and the network 116. The device may utilize the mobile communications network 122 when the device is not in communication with the network 116 via the CPE 118 or another network access point.

Each of the user devices 102-110 may include a processor and a memory accessible to the processor. A particular processor may execute instructions stored in an associated memory to perform operations. The operations may include, but are not limited to, receiving a request for particular media content; sending requests for chunks of the particular media content to the content source 114 via the LAN 120, the network 116, the mobile communications network 122, or combinations thereof, to stream the particular media content to the particular processor via adaptive bit rate streaming; receiving the chunks from the content source 114, processing the chunks to provide an output; and sending the output to one or more output devices (e.g., a particular display device associated with the particular processor, an audio system associated with the particular processor, or both).

As an example, the media device 102 may include a processor 126. The processor 126 may be coupled to a network interface 128, device interfaces 130, and a memoly 132. The network interface 128 may enable the media device 102 to communicate with other devices via the CPE 118. The other devices may include, but are not limited to, devices associated with the network 116 (e.g., the content source 114, the network monitor 112, one or more routers, digital subscriber line access multiplexers (DSLAMs), broadband remote access servers, a cable network video head end, etc.), and devices associated with the LAN 120 (e.g., the computing system 106 and the portable computing device 108).

The device interfaces 130 may enable wired or wireless connections of components and selected devices to the media device 102. The components may include, but are not limited to, the display device 104, sound system, a camera system, a motion detector, another type of device, or combinations thereof.

The memory 132 may store data, such as settings and stored media content. The settings may include values for various options associated with the media device 102. The values may be accessed and changed via one or more configuration interfaces. The memory 132 may include a buffer 134. The buffer 134 may provide temporary storage for processed media content that is to be sent to one or more output devices (e.g., the display device 104). The buffer 134 may be used to inhibit underflow of media content streamed to the media device 102 that would disrupt playback of the media content. The memory 132 may also include instructions 136 executable by the processor 126. The instructions 136 may be executable by the processor 126 to receive a request for media content, send queries about network conditions to the network monitor 112, receive data about the network conditions from the network monitor 112, send requests for chunks of the media content to the content source 114 based on the data, receive the chunks of media content from the content source 114, process the chunks of media content to provide an output, and send the output to one or more output devices (e.g., the display device 104).

In a particular embodiment, a device of the user devices 102-110 may communicate with the network monitor to receive network data. In the description below, an exemplary embodiment is described in which the device is the media device 102. In other embodiments, the device may be the computing system 106, the portable computing device 108, the mobile communication device 110, or another device.

In a particular embodiment, a user of the media device 102 may send a request to the media device 102 via a remote control device 124 for media content. The media content may be selected by the user from a listing of media content available to the media device 102. For example, the media content may be selected from a recommended content list provided to the media device 102 from the content source 114 and sent to the display device 104. The recommended content list may be generated by the content source 114 based on previous viewing patterns associated with the media device 102. In response to the request, the processor 126 may access a manifest for the media content via the network 116. The manifest may be located at the content source 114, at one or more network devices of the network 116, or combinations thereof. The manifest may be a table or a file that identifies chunks of the media content and available quality levels for each chunk. The available quality levels may correspond to specific spatial resolutions and specific temporal resolutions.

The processor 126 may select a particular quality level and may download a number of sequential chunks. The particular quality level may be selected based on user input (e.g., input that specified standard definition content or high definition content) or may be based on a user preferred setting or default setting for the media device 102. The processor 126 may process the number of sequential chunks to provide output data. The output data may be stored in the buffer 134. When the amount of output data in the buffer 134 exceeds a threshold, the processor 126 may initiate playback of the media content by sending the output data, or signals derived from the output data, to one or more output devices (e.g., the display device 104). Concurrent with playback to the one or more output devices, the processor 126 may continue to sequentially request chunks of the media content, process the media content, and send output data to the buffer 134.

The processor 126 may send queries to the network monitor 112 for network data about network conditions associated with the media device 102 at various times, such as when a chunk of the number of chunks is requested, during downloading of the chunk, when the chunk is completely downloaded, or combinations thereof. The processor 126 may determine a throughput history for downloading chunks during downloading of the number of sequential chunks based on the data received from the network monitor 112. The processor 126 may update the throughput history based on the data received in response to subsequent queries sent by the processor 126 to the network monitor 112.

The network monitor 112 may receive monitoring data from devices of the network 116, devices of the mobile communications network 122, or both. A processor 138 of the network monitor 112 may access a memory 140 to execute instructions 142 stored in the memory 140 in response to a query received from the media device 102. The instructions 142 executed by the processor 138 may cause the network monitor 112 to generate the network data pertaining to one or more network devices in a communication path between the media device 102 and the content source 114 that sends requested chunks of the media content to the media device 102. The one or more network devices may include, but are not limited to, a cable system video head of the network 116, a DSLAM of the network 116 that services the CPE 118, the CPE 118, a server associated with the content source 114, a router associated with the content source 114, or combinations thereof. The processor 138 may send the data to the media device 102. The network data may include key performance indicators (kpi) for one or more network devices in a pathway from the device to the content source. The kpi may include, but is not limited to, a data rate available for devices in a next scheduling cycle, utilization of physical resource blocks, usage load of the network device (e.g., number of devices using the network device divided by a maximum number of recommended devices), signal strength, a modulation/encoding rate assigned to the device, other information, or combinations thereof.

The processor 126 of the media device 102 may use the throughput history and recent network data received from the network monitor 112 to determine a quality level of a media chunk to be requested from the content source 114 after playback of the media content is initiated. For example, the throughput history may indicate that throughput to the media device 102 is trending downwards. Based on this information, the media device may determine to request the next chunk at a reduced quality level. The recent network data may indicate that utilization of physical resource blocks for a particular network device became significantly lower (e.g., went from 98% to 70%). The reduction in the utilization may indicate that the particular network device will provide more throughput to the media device 102. Based on this information, the media device 102 may determine to not change the quality level to a lower quality level. Use of the network data may enable quick responses to changing network conditions.

Before a particular chunk is requested, during download of the particular chunk or after the particular chunk is downloaded, the processor 126 may determine to change a quality of level of the particular chunk. For example, during download of a most recently downloaded chunk, the throughput history may indicate that a condition of the network 116 was poor when download of the most recently downloaded chunk was initiated, but the throughput may also indicate that the conditions improved during download of the last portion of the most recently downloaded chunk. In response, the processor 126 may determine to increase a quality level in a request for the chunk that follows the most recently downloaded chunk.

As another example, during download of a particular chunk, the data may indicate a problem with the network 116 that will slow download of the particular chunk so that disruption of playback of the media content by the media device 102 will occur (i.e., the disruption will result in underflow of the buffer 134). In response, the processor 126 may determine to download the particular chunk of media content at a lower quality level that will enable the particular chunk to be downloaded without disruption of playback. The processor 126 may replace (e.g., overwrite) in the buffer 134 previous output of the media content with output of the media content produced from the chunk received at the lower quality level.

As another example, the processor 126 may receive a last packet of a particular chunk. The processor 126 may determine based on the data whether enough time remains to download the particular chunk at a higher quality level without disruption of playback of the media content. When the determination is that enough time remains to download the particular chunk at the higher quality level, the processor 126 may send a request for the particular chunk at the higher quality level, process portions of the particular chunk received at the higher quality level, and replace the particular chunk in the buffer with the output produced by processing the particular chunk at the higher quality level.

In some embodiments, the media device 102 may send a priority request to the network monitor 112 when the media device sends a request for a particular chunk at a second quality for which the media device 102 already sent a request at a first quality level. In response to the priority request, the media device 102 may send a command that increases a priority of the media device 102 for receiving media content to one or more devices in a communication path from the content source 114 to the media device 102.

In some embodiments, a particular device of the user devices 102-110 may not be able to communicate with the network monitor 112. In such embodiments, a proxy server in a communication path between the content source 114 and the particular device may communicate with the network monitor 112. Descriptions regarding use of the proxy server to change a request for a particular chunk of streaming media content are provided in reference to FIG. 2.

Figure 2:
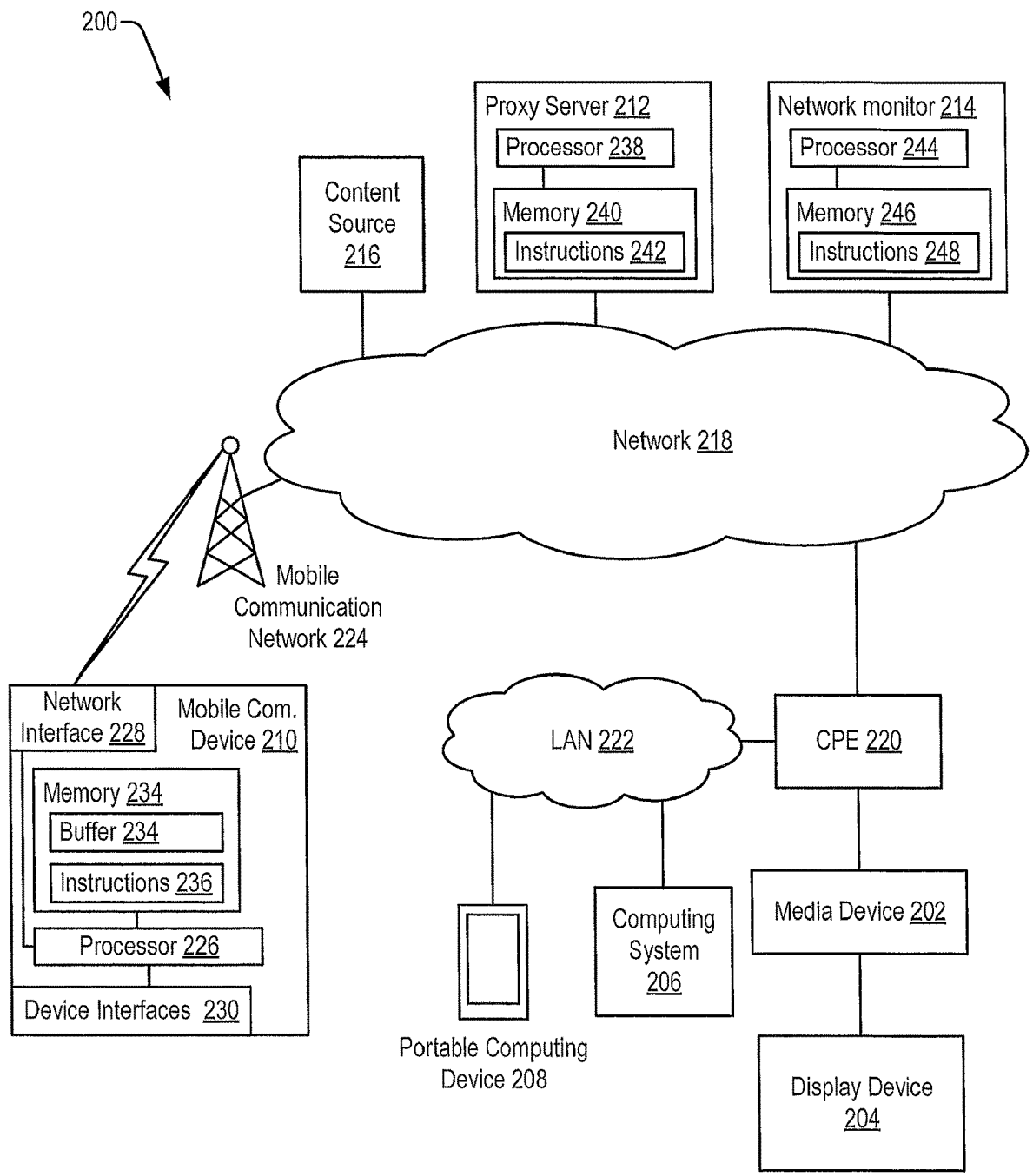
FIG. 2 is a block diagram of a second embodiment of a system for adaptive bit rate media streaming based on network conditions received by a proxy server via a network monitor.

FIG. 2 is a block diagram of a second particular embodiment of a system 200 for adaptive bit rate media streaming of media content to a particular device of user devices 202-210 associated with a user based on network conditions received by a proxy server 212 via a network monitor 214. The media content may be streamed by adaptive bit rate streaming to the particular user device from a content source 216. The media content may include, but is not limited to, video content from a video service or service provider, television programming, media on-demand, pay per view programming, audio programming, other content, or combinations thereof.

The user devices 202-210 may include, but are not limited to, one or more media devices 202 and one or more coupled output devices (e.g., one or more sound systems, one or more display devices 204, and combinations thereof), one or more computing systems 206, one or more portable computing devices 208 (e.g. laptop computers, tablet computers, computerized glasses, personal digital assistants, etc.), one or more mobile communication devices 210 (e.g., a mobile phone), other devices, or combinations thereof. The number and type of user devices associated with a particular user may vary. A media device 202 may be a set-top box device, game system, or another device able to send media content to output devices coupled to the media device 202 and able to communicate via a network 218 (e.g., the internet, a private network, or both). The media device 202 may be an integral component of a display device 204 or a separate component.

One or more of the user devices 202-210 may receive streaming media content from the network 218 via customer premises equipment (CPE) 220. The CPE 220 may facilitate communications between the network 218 and each media device 202 coupled to the CPE 220. The CPE 220 may also facilitate communications to and from the network 218 and one or more user devices (e.g., user devices 206-210) coupled by a wireless connection or a wired connection to a local area network (LAN) 222 established by, or accessible to, the CPE 220. The CPE 220 may be an access point to the network 218. The CPE 220 may include a router, a wireless router, a local area network device, a modem (e.g., a digital subscriber line modem or a cable modem), a residential gateway, another communication device, or combinations thereof.

A device of the user devices 202-210 (e.g., the portable computing device 208 or the mobile communication device 210) may be able to receive streaming media content via a mobile communication network 224 and the network 218. The device may utilize the mobile communications network 224 when the device is not in communication with the network 218 via the CPE 220 or another network access point.

Each of the user devices 202-210 may include a processor and a memory accessible to the processor. A particular processor may execute instructions stored in an associated memory to perform operations. The operations may include, but are not limited to, receiving a request for particular media content; sending requests for chunks of the particular media content to the content source 216 via the proxy server 212, receiving the chunks via the proxy server 212, processing the chunks to provide output; and sending the output to one or more output devices (e.g., a particular display device associated with the particular processor, an audio system associated with the particular processor, or both).

As an example, the mobile communications device 210 may include a processor 226. The processor 226 may be coupled to a network interface 230, device interfaces 232, and a memory 234. The network interface 228 may enable the mobile communications device 210 to communicate with other devices via the mobile communications network 224. The other devices may include, but are not limited to, devices associated with the mobile communication network 224 (e.g., a base station or base stations located near the mobile communications device 210) and devices associated with the network 218, (e.g., the proxy server 212, the network monitor 214, and the content source 216).

The device interfaces 230 may enable communication of the processor 226 with input devices and output devices. The input devices may include, but are not limited to, one or more microphones, one or more buttons, a touch screen, a touch pad, a keyboard, one or more input connectors to enable connection to external devices, other inputs, or combinations thereof. The output devices may include, but are not limited to, a display device (e.g., the touch screen), one or more speakers, one or more connectors to enable connection to external devices, other outputs, or combinations thereof.

The memory 232 may store data, such as settings and stored media content. The settings may include values for various options associated with the mobile communications device 210. The values may be accessed and changed via one or more configuration interfaces. The memory 232 may include a buffer 234. The buffer 234 may provide temporary storage for processed media content that is to be sent to one or more of the output devices. The buffer 234 may be used to inhibit underflow of media content streamed to the mobile communications device 210 that would disrupt playback of the media content. The memory 232 may also include instructions 236 executable by the processor 226. The instructions 236 may be executable by the processor 226 to receive a request for media content, send requests for chunks of the media content to the content source 216 based on historical throughput, receive the chunks of media content from the content source 216, process the chunks of media content to provide output, and send the output to one or more output devices.

In a particular embodiment, a device of the user devices 202-220 may receive streaming media content from the content source 216. In the description below, the device is the mobile communication device 110. In other embodiments, the device may be the media device 202, the computing system 206, the portable computing device 208, or another device.

In a particular embodiment, a user of the mobile communications device 210 may enter a command via one or more input devices that requests media content. The media content may be selected by the user from a listing of media content available to the mobile communications device 210. In response to the c0mnand, the processor 226 may access a manifest for the media content via the mobile communication network 224 and the network 218. The manifest may be a table or a file that identifies chunks of the media content and available quality levels for each chunk. The available quality levels may correspond to specific spatial resolutions and specific temporal resolutions.

The processor 226 may select a particular quality level and may send a request for a first chunk of the media content at the particular quality level to the content source via the proxy server 212. The proxy server 212 may receive the request from the mobile communications device 210. A processor 238 of the proxy server 212 in communication with a memory 240 may execute instructions 242 stored in the memory 240 in response to the request. The instructions may cause the processor 238 to send a request for network data about network conditions to the network monitor 214.

The network monitor 214 may receive monitoring data from devices of the network 116 and the mobile communications network 224. A processor 244 of the network monitor 214 may access a memory 246 to execute instructions 248 stored in the memory 246 in response to a query received from the mobile communications device 210. The instructions 248 executed by the processor 244 may cause the network monitor 214 to generate the network data pertaining to one or more network devices in a communication path between the mobile communications device 210 and the content source 216 that sends requested chunks of the media content to the mobile communications device 210. The one or more network devices may include, but are not limited to, a base station or base stations that are near the mobile communications device 210, a server associated with the content source 216, a router associated with the content source 216, a cable system head end, or combinations thereof. The processor 244 may send the network data to the proxy server 212. The network data may include key performance indicators (kpi) for one or more network devices in a pathway from the device to the content source. The kpi may include, but is not limited to, a data rate available for devices in a next scheduling cycle, utilization of physical resource blocks, usage load of the network device (e.g., number of devices currently using the network device divided by a maximum number of recommended devices), signal strength, a modulation/encoding rate assigned to the device, other information, or combinations thereof.

Based on the data received from the network monitor 214, the processor 238 of the proxy server 212 may make a determination about whether to change the particular quality level. The processor 238 may determine to lower the particular quality level if the network data indicates problems (e.g., low data throughput to the mobile communications device 210 because of high usage load for the base station servicing the mobile communication device 210) in the communications path between the content source 216 and the mobile communications device 210. The processor 238 may determine to increase the particular quality level if the network data indicates that data communication conditions between the content source 216 and the mobile communications device 210 have improved. The processor 238 may also determine to leave the request unchanged. Based on the determination, the processor 238 sends a request for the particular chunk at a selected quality level to the content source 216. The content source 216 sends the particular chunk at the selected quality level to the proxy server 212. The processor 238 of the proxy server 212 forwards the particular chunk to the mobile communications device 210. When the determination of the proxy server 212 is to change the quality level, the proxy server may send a priority request to the network monitor 214. In response to the priority request, the network monitor 214 may send a control command to one or more network devices to increase a priority of communications associated with the mobile communications device 210. Increasing the priority associated with the mobile communications device 210 may enable receipt of the particular chunk of media content by the mobile communications device 210 before disruption of playback of the media content by the mobile communications device 210 occurs.

Figure 3:
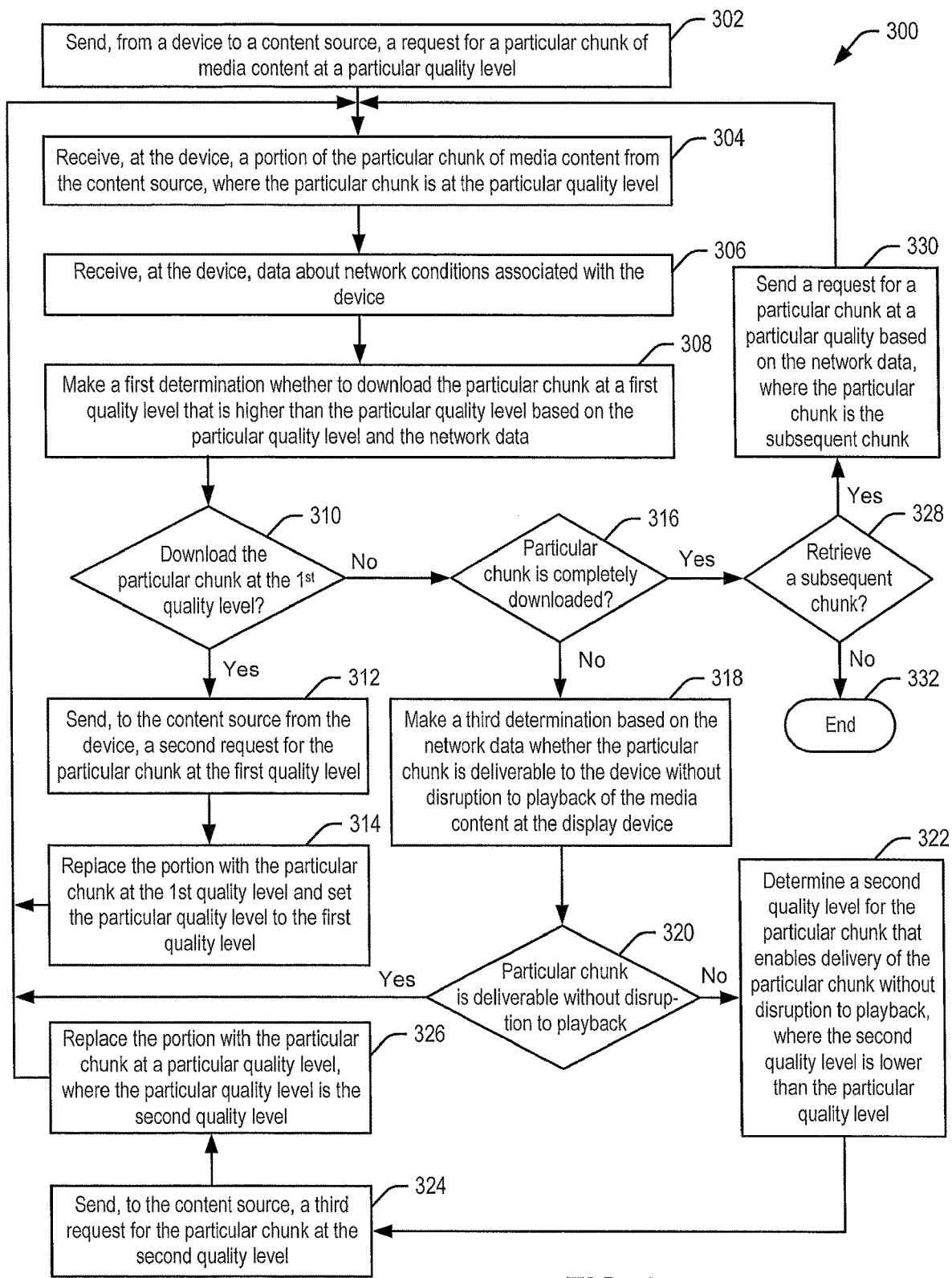
FIG. 3 is a flowchart of a first particular embodiment of a method for adaptive bit rate media streaming based on network conditions received via a network monitor.

Referring to FIG. 3, a flowchart of a first particular embodiment of a method 300 for adaptive bit rate media streaming based on network conditions received via a network monitor is shown. The method 300 may be performed by a device (e.g., one of the user devices 102-110 of FIG. 1). The device may send a request for a particular chunk of media content at a particular quality level to a content source, at 302. The device may receive a portion of the particular chunk of media content at the particular quality level from the content source, at 304.

The device may receive network data about network conditions associated with the device, at 306. The network data may be received in response to receipt of the portion or may be received at particular times. The network data may be received in response to a query sent from the device to a network monitor. The network monitor may be a software-defined networking controller. The device may send queries for network data about network conditions to the network monitor at scheduled times, when particular portions of the particular chunk has been received (e.g., 25%, 50%, 75%, and 100% or other selected percentages), at other times during download of the particular chunk, when all of the particular chunk is received at the device, or combinations thereof.

The network data may include key performance indicators (kpi) for one or more network devices in a pathway from the device to the content source. The kpi may include, but is not limited to, data rate available for devices in a next scheduling cycle, utilization of physical resource blocks, usage load of the network device (e.g., number of devices currently using the network device divided by a maximum number of recommended devices), signal strength, modulation/encoding rate assigned to the device, other information, or combinations thereof. In some embodiments, the network data may be data for one or more devices that are likely to be bottlenecks for data flow to the device, from the device, or both. For example, in a mobile communications network, the network monitor may include in the network data kpi for a base station that transmits data to the device. The base station may be a bottleneck point in the communications pathway between the device and the content source. The kpi may include scheduling intention for the base station, which indicates what data rate will be available for each client device using the base station in the next scheduling cycle of the base station.

The device may make a first determination whether to download the particular chunk at a first quality level that is higher than the particular quality level based on the particular quality level and the network data, at 308. The first determination may be not to download the particular chunk at the first quality level when the particular quality level is a highest quality level.

In an exemplary embodiment, the device may use a pointer to identify a location in a buffer where storage of output data (e.g., video output data, audio output data, or both) generated by the device from the particular chunk at the particular quality begins. The device may send output data, or signals based on the output data, from the buffer to one or more output devices during playback of the media content. The pointer, in conjunction with a corresponding pointer for a previous chunk, may be used by the device to determine whether playback of the particular chunk at the particular quality level has commenced or is about to commence (e.g., will c01mnence before portions of the particular chunk at a different quality level can be received and processed to output data for the buffer). The first determination may include determining whether playback of the particular chunk has commenced or is about to commence.

When playback of the particular chunk has commenced or is about to commence, the device may communicate with the network monitor to instruct the network monitor to send one or more commands to network devices when all of the particular chunk has not been received by the device. The one more commands may increase a priority associated with the device (for one or more network devices sending data to the device) to increase a likelihood of the device receiving all of the particular chunk at the particular quality level before underflow of the buffer occurs. The device continues to download the particular portion at the particular quality level until the download of the particular chunk at the particular quality level is complete. When playback of the particular chunk has commenced and all of the chunk has been downloaded, the method 300 may continue at 328.

The network data may indicate whether network changes are static, improving, or degrading in conjunction with previously received network data. Based on historical information associated with receiving requested data at the device (e.g., download rate and quality of received requested data), based on the network conditions c01Tesponding to the historical information, based on information in the network data, or based on combinations thereof, the device may determine whether the device has sufficient time to download the particular chunk at the first quality without disruption to playback of the media content to one or more output devices coupled to the device. Disruption to playback may occur when there is underflow of a buffer of the device that stores media content to be sent to the one or more output devices. The device may determine an amount of time that remains before the device needs to provide the particular chunk to the one or more output devices. When the amount of time multiplied by a safety factor to accommodate degraded network conditions is greater than an estimated time needed to download the particular chunk at the first quality, the determination may be made to download the particular chunk at the first quality level.

When the first determination indicates to download the particular chunk at the first quality level, at 310, the device may send a second request for the particular chunk at the first quality level to the content source, at 312. The device may communicate with the network monitor to have the network monitor send control information to the one or more network devices (e.g., to the base station) that increases a priority level of the device so that the device is more likely to receive the particular chunk without disruption to playback.

The device may replace the portion with the particular chunk at the first quality level, at 314. When the device begins receiving the particular chunk at the first quality level, the device may overwrite output data in the buffer with output data corresponding to the particular chunk at the first quality level beginning at the location identified by the pointer associated with the particular chunk. The method 300 may return to 304, where the particular quality level is set to the first quality level.

When the first determination indicates not to download the particular chunk at the first quality, at 310, a second determination may be made whether the particular chunk is completely downloaded, at 316. When the second determination indicates that the particular chunk is not completely downloaded, at 316, a third determination based on the data may be made to determine whether the particular chunk is deliverable to the device without disruption to playback of the media content at the display device, at 318. When the third determination indicates that the particular chunk is deliverable to the device without disruption to playback of the media device at the display device, at 320, the method 300 may return to 304, where the particular quality level remains unchanged.

When the third determination indicates that the particular chunk is not deliverable to the device without disruption to playback of the media device at the display device, at 320, a second quality level for the particular chunk may be determined that enables delivery of the particular chunk without disruption to playback of the media content to the display device. For example, the network data may indicate that network conditions have degraded or slowed down significantly enough to reduce a probability of retrieving the particular chunk before media content in the buffer from a previously received chunk is sent to the display device below a threshold. In response, the device may deten1line that the particular chunk at a second quality level, which is lower than the particular quality level, has a probability above a second threshold of being completely downloadable based on the network conditions indicated by the network data.

The device may send a third request for the particular chunk at the second quality level, at 324. The device may communicate with the network monitor to have the network monitor send control information to the one or more network devices (e.g., to the base station) that increases a priority level of the device so that the device is more likely to receive the particular chunk at the second quality level without disruption to playback. The device may replace the portion of the particular chunk with the particular chunk at the second quality level, at 326. When the device begins receiving the particular chunk at the second quality level, the device may overwrite output data in the buffer with output data corresponding to the particular chunk at the second quality level beginning at the location identified by the pointer associated with the particular chunk. The method 300 may return to 304, where the particular quality level is set to the second quality level.

When the second determination indicates that the particular chunk is completely downloaded, at 316, a fourth determination may be made to determine whether a subsequent chunk is to be retrieved, at 328. The subsequent chunk is to be retrieved when the device has not received input that stops retrieval of the media content and when the particular chunk is not the last chunk of the media content. When the fourth determination is to retrieve the subsequent chunk, at 328, the device may send a request for a particular chunk at a third quality based on the network data, where the particular chunk is the subsequent chunk, at 330. The third quality may be the particular quality level, may be higher than the particular quality level, or may be lower than the particular quality level. The method 300 may return to 304, where the particular quality is set to the third quality level. When the fourth determination is not to retrieve the subsequent chunk, at 328, the method 300 ends at 332.

Figure 4:
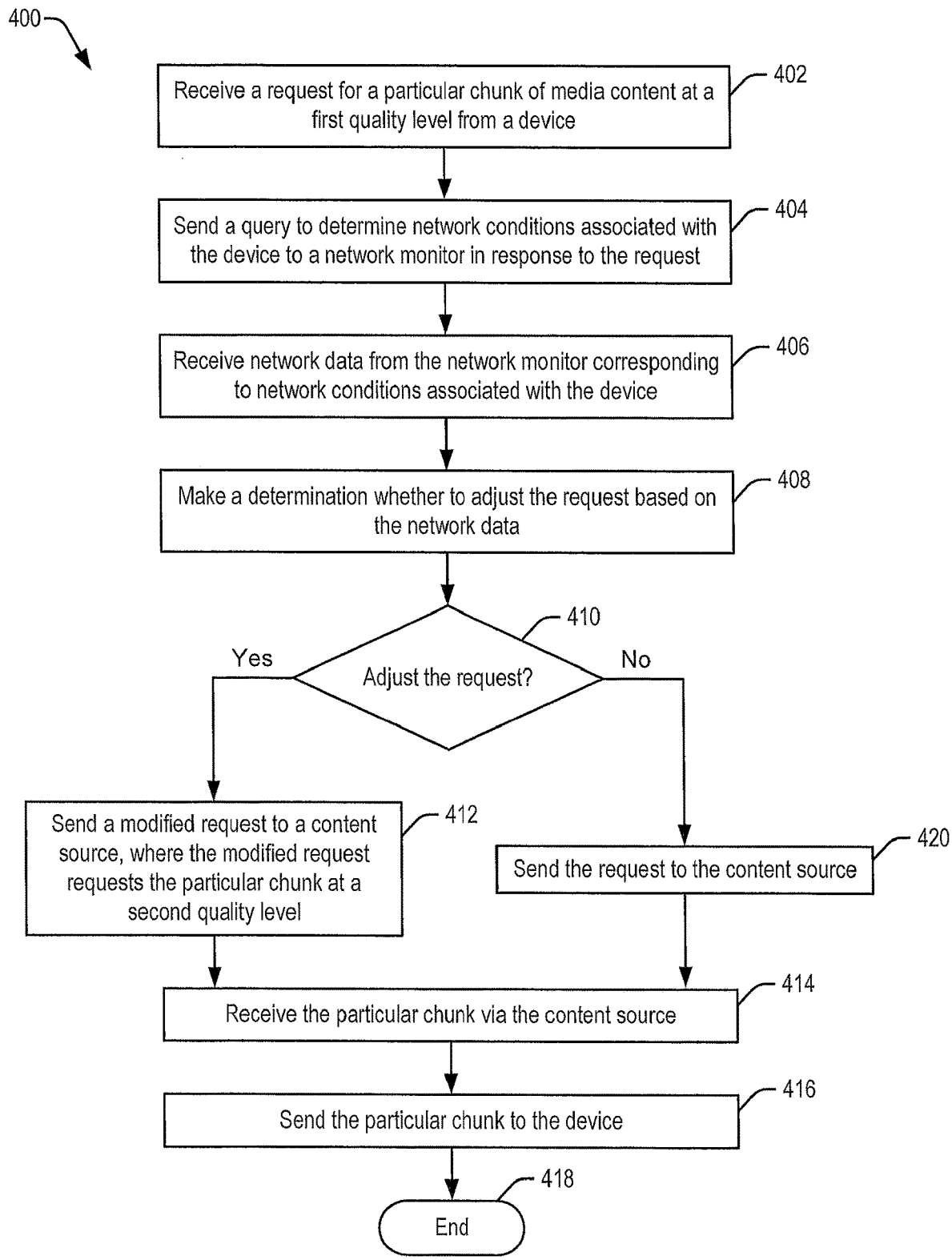
FIG. 4 is a flowchart of a second particular embodiment of a method for adaptive bit rate media streaming based on network conditions received via a network monitor.

Referring to FIG. 4, a flowchart of a second particular embodiment of a method 400 for adaptive bit rate media streaming based on network conditions received via a network monitor is shown. The method 400 may be performed by the proxy server 212 depicted in FIG. 2. The proxy server may receive a request for a particular chunk of media content at a first quality level from a device, at 402. The device may be a device capable of receiving and processing adaptive bit rate streaming media (e.g., one of the user devices 202-210 depicted in FIG. 2).

The proxy server may send a query to determine network conditions associated with the device to a network monitor in response to the request, at 404. The network monitor may be a software-defined networking controller. The network monitor may return key performance indicators (kpi) for one or more network devices in a communication pathway from the device to a content source for the particular chunk. The one or more network devices may include a network device that is a typical bottleneck in the communications pathway from the device to the content source. For example, in a mobile communications network, the network monitor may include kpi for a base station that transmits data to the device. The base station may be a bottleneck point in the communications pathway from the device to the content source. The kpi may include scheduling intention for the base station, which indicates what data rate will be available for each client device using the base station in the next scheduling cycle.

The proxy server may receive network data from the network monitor corresponding to network conditions associated with the device, at 406. The proxy server may make a determination whether to adjust the request based on the network data, at 408.

When the determination is to adjust the request, at 410, the proxy server may send a modified request to the content source. The modified request may request the particular chunk at a second quality level. The second quality may be a higher quality level than the first quality level when the data indicates that network conditions enable retrieval of the particular chunk at a quality that is better than the quality of the first quality level. The second quality may be a lower quality level than the first quality level when the data indicates that network conditions have degraded.

When the proxy server determines to change the request to either a lower quality level chunk or a higher quality level chunk, the proxy server searches a manifest table, or manifest file to find required parameters of the particular chunk at the second quality level (e.g., file name, offset, and length). The proxy server may generate the manifest table, or manifest file, based on inspection of requests for media content, or the proxy server may retrieve at least a portion of the manifest table, or manifest file, from the content source or another source.

The proxy server may receive the particular chunk via the content source, at 414. The quality level of the particular chunk may be the second quality level. The proxy server may send the particular chunk to the device, at 416. The method 400 may end at 418.

When the determination is not to adjust the request, at 410, the proxy server sends the request to the content source, at 420. The proxy server may receive the particular chunk via the content source, at 414. The quality level of the particular chunk may be the first quality level. The proxy server may send the particular chunk to the device, at 416. The method 400 may end at 418.

Various embodiments disclosed herein describe user devices that receive streaming media content from a content source via adaptive bit rate media streaming. A user device, or a proxy server in a communication path between the user device and the content server, determine a quality level for a particular chunk based on data indicative of network conditions. The data indicative of network conditions is provided by a network monitor. In addition to providing the data indicative of network conditions, the network monitor may be a controller that is configured to send commands to one or more network devices that increase a priority associated with the user device to increase a likelihood that the user device will receive a requested chunk of media before disruption to playback of the media content occurs. Determining the quality level based on network conditions may enable increased responsiveness to changes in network conditions. The increased responsiveness may enable delivery of the media content at an overall higher quality level than can be delivered based only on determining the quality level of a requested chunk based on historical throughput information. The increased responsiveness may also inhibit disruption of media content playback by reducing a likelihood of buffer underflow. Increasing the overall quality of media content and inhibiting disruption of media content playback may promote customer satisfaction with a service provider and customer retention by the server provide.

Figure 5:
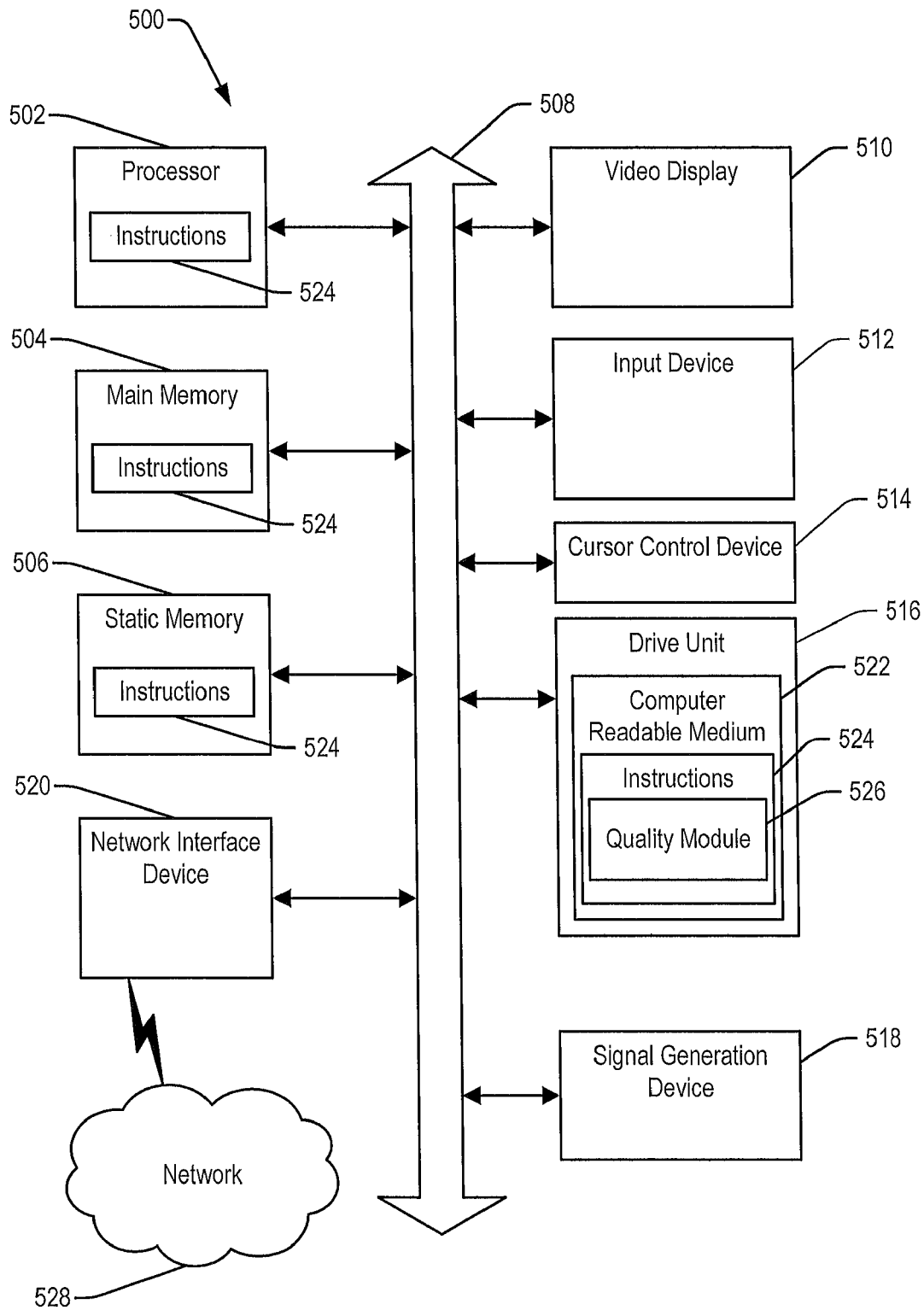
FIG. 5 is a block diagram of an illustrative embodiment of a general computer system.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the user devices 102-110, 202-210, the network monitors 112, 214, the content sources 114, 216, the proxy server 212, the CPEs 118, 220, the remote control device 124, or combinations thereof described with reference to FIG. 1 and FIG. 2.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), a set-top box, a customer premises equipment device, an endpoint device, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 may include a main memory 504 and a static memory 505, which can communicate with each other via a bus 508. As shown, the computer system 500 may further include a video display unit 510, such as a liquid crystal display (LCD), a light emitting diode (LED) display, a touch screen display, a flat panel display, a solid-state display, or a lamp assembly of a projection system. Additionally, the computer system 500 may include an input device 512, such as a keyboard, and a cursor control device 514, such as a mouse. In some embodiments, the input device 512 and the cursor control device 514 may be integrated into a single device, such as a capacitive touch screen input device. The computer system 500 may also include a drive unit 516, a signal generation device 518, such as a speaker or remote control, and a network interface device 520. Some computer systems 500 may not include an input device (e.g., a server may not include an input device).

In a particular embodiment, as depicted in FIG. 5, the drive unit 516 may include a computer-readable storage device 522 in which one or more sets of instructions 524, e.g. software, can be embedded. The computer-readable storage device 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or processor. A computer-readable storage device is not a signal. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable storage devices. The instructions 524 may include a quality module 526. The quality module may query a network monitor and determine a quality level of a particular chunk to request from a content source.

In an alternative embodiment, dedicated hardware implementations, such as application specific integrated circuits, programmable logic arrays and other hardware devices, may be constructed to implement one or more of the methods described herein. Various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include (forms of instructions embodied as a state machine implemented with logic components in an ASIC or a field programmable gate array (FPGA) device). Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations or methods may perform such operations directly or indirectly by way of one or more intermediate devices directed by the computing device.

The present disclosure includes a computer-readable storage device 522 that stores instructions 524 or receives, stores and executes instructions 524, so that a device com1ected to a network 528 may communicate voice, video or data over the network 528. While the computer-readable storage device 522 is shown to be a single device, the computer-readable storage device 522 may include a single device or multiple devices, such as a centralized or distributed database, and/or associated caches and servers that store one or more sets of instructions. The computer-readable storage device 522 is capable of storing a set of instructions for execution by a processor to cause a computer system to perform any one or more of the methods or operations disclosed herein.

In a particular non-limiting, exemplary embodiment, the computer-readable storage device 522 may include a solid-state memory such as embedded memory (or a memory card or other package that houses one or more non-volatile read-only memories). Further, the computer-readable storage device 522 may be a random access memory or other volatile re-writable memory. Additionally, the computer-readable storage device 522 may include a magneto-optical or optical device, such as a disk or tapes or other storage device. Accordingly, the disclosure is considered to include any one or more of a computer-readable storage device and other equivalents and successor devices, in which data or instructions may be stored.

Although one or more components and functions may be described herein as being implemented with reference to a particular standard or protocols, the disclosure is not limited to such standards and protocols. For example, standards for internet and other network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, Wi-Fi, Zigbee), and long-range communications (e.g., WiMAX, GSM, CDMA, LTE) can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Certain proportions thereof may be exaggerated, while others may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a Field PGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claim1s reflect, subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodin1ents, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    during an adaptive bit rate media streaming of media content from a content source via a network:
        sending, by a first device, a query, to a second device that is distinct from the content source, for network data related to network conditions associated with the network;
        receiving, by the first device, the network data;
        determining, by the first device, a first time remaining before a first particular chunk of the media content is required;
        determining, by the first device, a second time required to download the first particular chunk according to the network data; and
        determining, by the first device, whether the second time required to download the first particular chunk exceeds the first time;
    in response to the determining the second time required to download the first particular chunk exceeds the first time and a first determination to download a first particular chunk of the media content at a first quality level, the determination based on the network data:
        sending, by the first device, a first request to the content source for the first particular chunk of the media content at the first quality level; and
        replacing, by the first device, a previously received portion of the media content with a corresponding portion of the first particular chunk of the media content received at the first quality level; and
    in response to a second determination to download a second particular chunk of the media content at a second quality level, the second determination based on the network data:
        sending, by the first device, a second request to the content source for the second particular chunk of the media content at the second quality level; and
        sending, by the first device, a priority request to the second device, to increase a priority associated with the first device.

2. The method of claim 1, further comprising receiving, by the first device, the first particular chunk of the media content at the first quality level.

3. The method of claim 1, wherein the receiving of the network data is responsive to receiving a third particular chunk of the media content at a third quality level.

4. The method of claim 1, wherein the second device commands a network device to increase a network priority associated with the first device.

5. The method of claim 1, wherein the second quality level is lower than the first quality level.

6. The method of claim 1, wherein the second quality level is greater than the first quality level.

7. The method of claim 1, wherein the sending the request for the first particular chunk at the first quality level is further based on information in a manifest associated with the media content.

8. The method of claim 1, wherein the second device commands a base station device to increase a network priority associated with the first device.

9. The method of claim 1, wherein the network data includes performance indicators for a network device in a communication path between the first device and the content source.

10. The method of claim 9, wherein the performance indicators for the network device include a data rate available for clients in a next scheduling cycle, utilization of physical resource blocks, usage load, signal strength, or combinations thereof.

11. A device, comprising:
a processing system including a processor; and
a memory that stores executable instructions that, when executed by the processing system, facilitate performance of operations, the operations comprising:
during an adaptive bit rate media streaming of media content from a content source via a network:
sending a query, to a second device, for network data related to network conditions associated with the network;
receiving the network data;
determining a first time remaining before a first particular chunk of the media content is required;
determining a second time required to download the first particular chunk according to the network data; and
determining whether the second time required to download the first particular chunk exceeds the first time;
in response to the determining the second time required to download the first particular chunk exceeds the first time and a first determination to download a first particular chunk of the media content at a first quality level, the first determination based on the network data:
sending a first request to the content source for the first particular chunk of the media content at the first quality level; and
replacing a previously received portion of the media content with a corresponding portion of the first particular chunk of the media content received at the first quality level; and
in response to a second determination to download a second particular chunk of the media content at a second quality level, the second determination based on the network data:
sending a second request to the content source for the second particular chunk of the media content at the second quality level; and
sending a priority request to the second device, to increase a priority associated with the device.

12. The device of claim 11, wherein the second device is distinct from the content source.

13. The device of claim 11, wherein the second device commands a network device to increase a network priority associated with the device.

14. The device of claim 11, wherein the operations further comprise receiving the first particular chunk of the media content at the first quality level.

15. The device of claim 11, wherein the receiving of the network data is responsive to receiving a third particular chunk of the media content at a third quality level.

16. A non-transitory machine-readable medium, comprising executable instructions that, when executed by a processing system including a processor, facilitate performance of operations, the operations comprising:
during adaptive bit rate media streaming of media content to a first device via a network, receiving, from a second device, network data corresponding to network conditions associated with the network;
determining a first time remaining before a first particular chunk of the media content is required;
determining a second time required to download the first particular chunk according to the network data; and
determining whether the second time required to download the first particular chunk exceeds the first time;
in response to the determining the second time required to download the first particular chunk exceeds the first time, receiving, from the first device, a first request to receive a first particular chunk of the media content at a first quality level;
analyzing the first request to receive the first particular chunk at the first quality level according to the network data;
sending a second request to a content source of the network for the first particular chunk at the first quality level according to the analyzing the first request;
sending a third request to a network device to increase a priority of the first device;
receiving the first particular chunk from the content source via the network; and
causing a network interface to send the first particular chunk to the first device via the network device according to the increase in the priority of the first device.

17. The non-transitory machine-readable medium of claim 16, wherein the network data includes performance indicators for the network device in a communication path between the first device and the content source.

18. The non-transitory machine-readable medium of claim 17, wherein the performance indicators for the network device include a data rate available for clients in a next scheduling cycle, utilization of physical resource blocks, usage load, signal strength, or any combination thereof.

19. The non-transitory machine-readable medium of claim 16, wherein the second device includes a network monitor that receives monitoring data from a plurality of devices that access the network.

20. The non-transitory machine-readable medium of claim 16, wherein the second device includes a proxy server that receives monitoring data from a plurality of devices that access the network.

* * * * *